United States Patent
Tomimatsu et al.

[11] Patent Number: 5,450,138
[45] Date of Patent: Sep. 12, 1995

[54] DISPLAY MONITOR

[75] Inventors: Satoru Tomimatsu; Kazuo Emmoto, both of Nagasaki, Japan

[73] Assignee: Mitsubishi Denki Kabushiki Kaisha, Chiyoda, Japan

[21] Appl. No.: 49,431

[22] Filed: Apr. 20, 1993

[30] Foreign Application Priority Data

May 7, 1992 [JP] Japan ................... 4-141087
Mar. 5, 1993 [JP] Japan ................... 5-069054

[51] Int. Cl.⁶ ............................................. H04N 5/57
[52] U.S. Cl. ..................... 348/678; 348/910; 348/687
[58] Field of Search ............... 358/169, 168, 167, 166, 358/170, 171, 160, 139, 161, 155, 36, 37, 39, 21 R; H04N 5/57; 348/671, 673, 677, 678, 679, 680, 682, 683, 684, 686, 910

[56] References Cited

U.S. PATENT DOCUMENTS

| | | |
|---|---|---|
| 3,710,175 | 1/1973 | Halpern . |
| 3,983,575 | 9/1976 | Nagai et al. .................. 358/161 |
| 4,496,978 | 1/1985 | Sakamoto et al. ........... 358/155 |
| 4,670,787 | 6/1987 | Levine ........................... 358/161 |
| 4,682,231 | 7/1987 | Yamakawa .................. 358/168 |
| 5,019,791 | 5/1991 | Cohen ............................ 331/96 |

FOREIGN PATENT DOCUMENTS

| | | |
|---|---|---|
| 3934762 | of 1990 | Germany . |
| 62-1381 | of 1987 | Japan . |
| 2-134164 | of 1990 | Japan . |
| 2-278284 | of 1990 | Japan . |
| 3-131181 | of 1991 | Japan . |

*Primary Examiner*—James J. Groody
*Assistant Examiner*—Michael H. Lee
*Attorney, Agent, or Firm*—Burns, Doane, Swecker & Mathis

[57] ABSTRACT

A display monitor includes a contrast controller which produces a contrast control signal that varies with time an intensity control signal, which is supplied from an intensity controller to a video signal controller, by being superimposed on the intensity control signal or a video signal inputted to the video signal controller. The contrast control signal varies in the form of a 1/f fluctuation so that the intensity of display varies with time, thereby reducing the screen flicker caused by the scanning operation of a constant period, whereby fatigue of the eyes of the operator in a long-term screen watching job is alleviated.

4 Claims, 4 Drawing Sheets

CLAMP SIGNAL

DISPLAY MONITOR

BACKGROUND OF THE INVENTION

1. Field of the Invention

The present invention relates to a display monitor which is intended to alleviate the fatigue of eyes of the operator.

2. Description of the Prior Art

FIG. 1 is a block diagram showing the principal portions of a conventional display monitor. In the figure, reference numeral 1 denotes an input terminal for receiving a video signal, 2 shows a video signal controller which implements the clamping and amplitude control for the input video signal, and 3 shows a variable resistor which is used to set the intensity of display and produces an intensity control signal to be supplied to the video signal controller 2 for controlling the amplitude of video signal.

A numeral 4 shows an amplifier which amplifies the video signal after it has been processed by the video signal controller, 5 shows variable resistor which is used to adjust the brightness of display and produces a level control signal to be supplied to the amplifier 4 for controlling the d.c. level of the amplified video signal, and 6 shows a cathode ray tube (will be termed "CRT" hereinafter) which displays on its screen a picture which is derived from the amplified video signal.

Next, the operation of the foregoing arrangement will be explained. FIG. 2 is an explanatory diagram showing the signal waveforms at the input and output of the video signal controller 2. The video signal shown by (A) in FIG. 2 received on the input terminal 1 is sent to the video signal controller 2, by which the signal level is clamped and the peak value is rendered the amplification or attenuation from "a" to "b" in accordance with the intensity control signal produced by the intensity setting variable resistor 3, and the resulting video signal shown by (B) in FIG. 2 is sent to the amplifier 4.

The amplifier 4 amplifies the video signal provided by the video signal controller 2 and applies the output to the cathode of the CRT 6, and the picture carried by the video signal is displayed on the CRT screen. The amplified video signal produced by the amplifier 4 has its d.c. level controlled by the level control signal produced by the brightness control variable resistor 5.

The intensity setting variable resistor 3 produces the intensity control signal based on its resistance set by the operator and sends it to the video signal controller 2, which responds to the signal to vary the amplification factor for the video signal so that the intensity of a picture, i.e., characters and figures, displayed on the screen of CRT 6 is adjusted.

The brightness control variable resistor 5 produces a brightness control signal based on its resistance set by the operator and sends it to the amplifier 4, which responds to the signal to vary the d.c. level of the amplified video signal so that the brightness of the whole picture including black portions displayed on the screen of CRT 6 is adjusted.

Another conventional display monitor has a function of adjusting the intensity automatically depending on the display condition. For example, when the display area on the screen is large, the cathode current of the CRT is limited so as to suppress the intensity of the whole area and at the same time prevent the collapse of display, or when the display area is small, the intensity is increased so as to produce a high intensity picture.

Still another conventional display monitor disclosed in Japanese Patent Unexamined Publication No. 3-131181 is designed to control the luminance signal directly so as to improve the balance of intensity of the whole picture.

These conventional display monitors are intended to improve the intensity level of the whole picture in a long period of time, i.e., one frame or more, thereby to prevent the collapse of display.

Still another conventional display monitor disclosed in Japanese Patent Unexamined Publication No. 62-1381 is designed to control the intensity of display depending on the environment (brightness of the room) so as to alleviate fatigue of the eyes of the operator, and this technique is also based on the control of intensity of the whole picture.

Still another conventional display monitor disclosed in Japanese Patent Unexamined Publication No. 2-278284 is designed to adjust the intensity while suppressing the flicker caused by the power noise by selecting a portion of well-balanced discharge luminescence frequencies in every horizontal scanning period, and this technique also controls the intensity within a period of the horizontal sync signal.

Although the conventional display monitors arranged as described above are designed to allow the operator to adjust the intensity of the CRT screen through the use of the intensity setting variable resistor 3, it is fixed at a set level during the operation. The CRT screen has a flicker at the vertical sync frequency as the scanning position moves from top to bottom, causing fatigue of the eyes of the operator. Raising the scanning frequency for suppressing the flicker results in a significant increase of cost.

Any of the foregoing conventional display monitors operates at a constant intensity unless there is a change in the environment (environmental changes include a change in the brightness of room, a change in the displayed picture and a change in the setting of the intensity setting variable resistor), and the CRT screen which is displaying a still picture has a flicker at a constant vertical sync frequency (e.g., 60 Hz) which causes fatigue of the eyes of the operator.

SUMMARY OF THE INVENTION

In view of the foregoing situation, it is an object of the present invention to provide a display monitor which reduces the screen flicker so as to alleviate the fatigue of eyes of the operator without imposing a significant increase of cost.

According to the first aspect of the present invention, for achieving the above-mentioned objective, there is provided a display monitor which includes a contrast controller that produces a contrast control signal for varying with time an intensity control signal, which is supplied from an intensity setting device to a video signal controller, by being superimposed on the contrast control signal.

According to the second aspect of the present invention, there is provided a display monitor which includes a contrast controller that produces a contrast control signal for varying with time the amplitude of a video signal, which is inputted to a video signal controller, by being superimposed on the video signal.

According to the third aspect of the present invention, for achieving the above-mentioned objective, there is provided a display monitor which operates to vary the intensity control signal or the amplitude of the video signal with time with a contrast control signal having a frequency spectrum with a slope of $-1$ when the power spectrum of frequency components are plotted on a graph with logarithmic scales for both axes.

In the display monitor based on the first aspect of the invention, the contrast controller produces a contrast control signal which varies periodically or non-periodically, and it is superimposed on the intensity control signal supplied from the intensity setting device to the video signal controller so as to vary with time the intensity of display on the screen, thereby reducing the screen flicker caused by the scanning operation of a constant period and alleviating the fatigue of the eyes of the operator.

In the display monitor based on the second aspect of the invention, the contrast controller produces a contrast control signal which varies periodically or non-periodically, and it is superimposed on the video signal inputted to the video signal controller so as to vary with time the intensity of display on the screen, thereby reducing the screen flicker caused by the scanning operation of a constant period and alleviating fatigue of the eyes of the operator.

In the display monitor based on the third aspect of the invention, the contrast controller produces a contrast control signal of a 1/f fluctuation to vary the intensity control signal or the amplitude of the video signal with time so as to blur the flicker at the vertical sync frequency, thereby reducing the screen flicker caused by the scanning operation of a constant period and alleviating the fatigue of the eyes of the operator.

These and other objects and novel features of the present invention will become more apparent from the following detailed description taken in conjunction with the accompanying drawings. The drawings are solely for the purpose of illustration and do not confine the scope of the invention.

DESCRIPTION OF THE PREFERRED EMBODIMENTS

Figure 1:
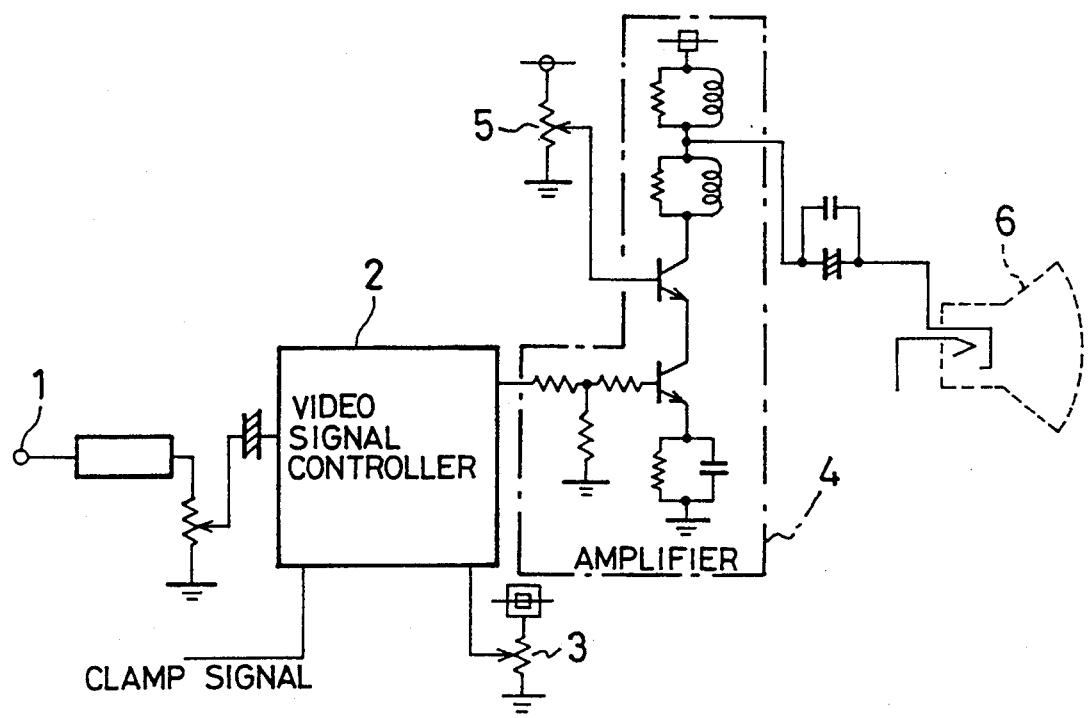
FIG. 1 is a block diagram showing the conventional display monitor.
Figure 2:
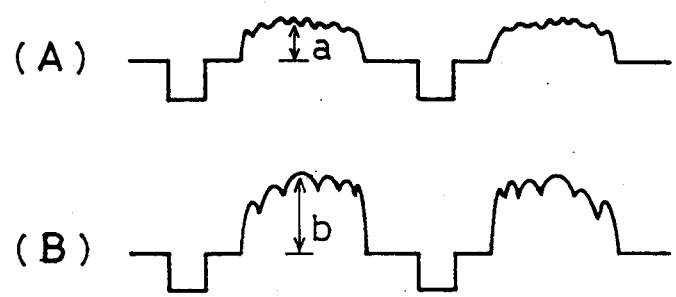
FIG. 2 is an explanatory diagram showing the signal waveforms at the input and output of the video signal controller.
Figure 3:
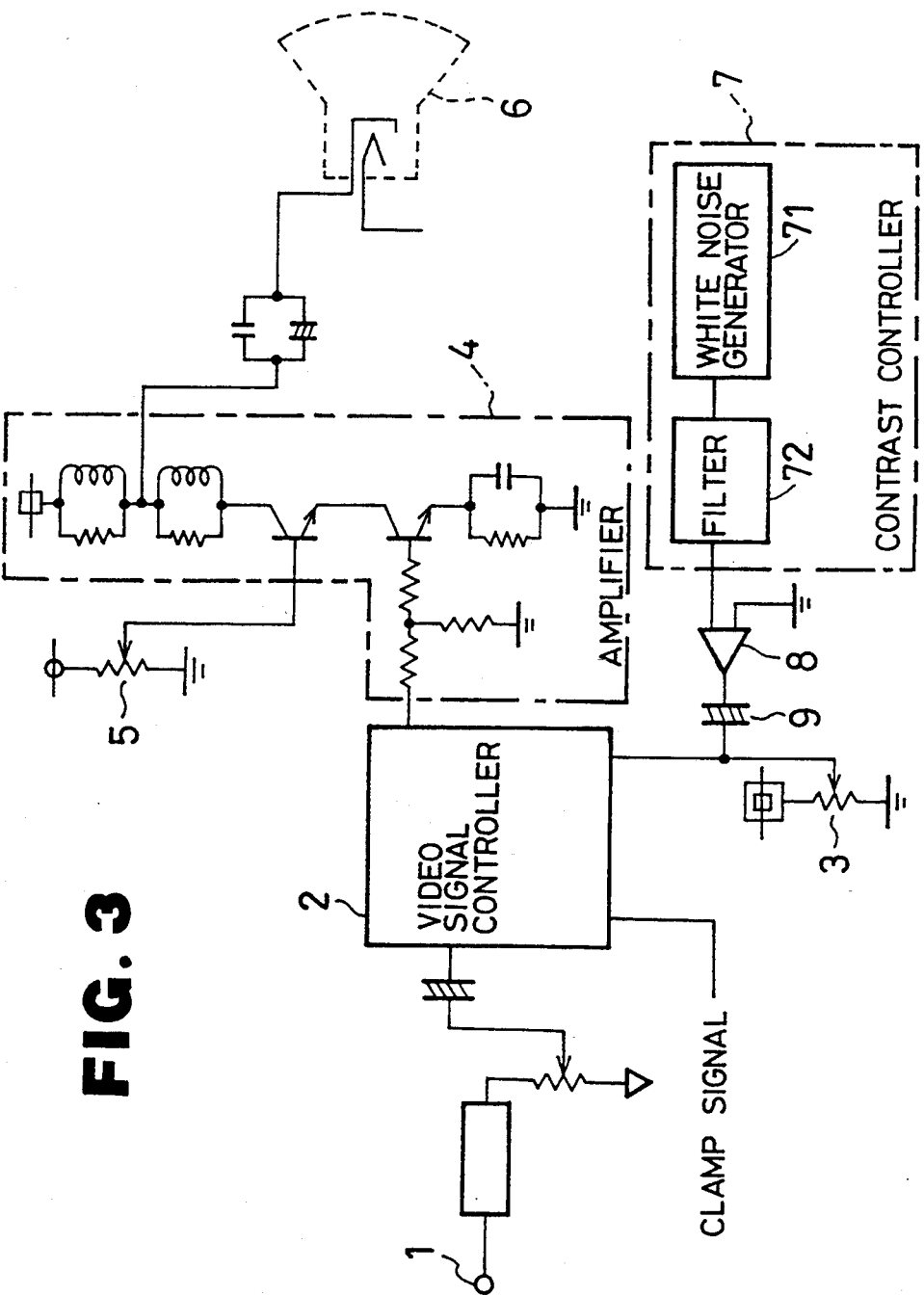
FIG. 3 is a block diagram showing the display monitor based on a first embodiment of this invention.
Figure 4:
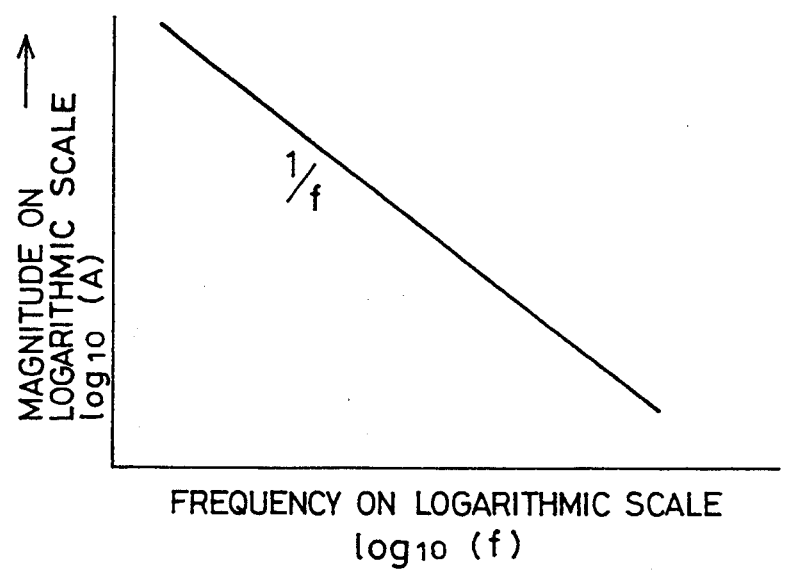
FIG. 4 is a graph used to explain the 1/f fluctuation.

Preferred embodiments of this invention will be described in detail with reference to FIG. 3 and FIG. 4, in which component parts identical to those of FIG. 1 are referred to by the common symbols and explanation thereof will not be repeated.

Embodiment 1

The first embodiment of this invention will be explained with reference to FIG. 3. In the figure, reference numeral 1 denotes an input terminal, 2 denotes a video signal controller, 3 denotes an intensity setting device as an intensity setting variable resistor, 4 denotes an amplifier, 5 denotes a brightness control variable resistor, and 6 denotes a display portion as a CRT display device.

Indicated by 7 is a contrast controller which produces a contrast control signal that varies periodically or non-periodically the intensity control signal, which is supplied from the intensity setting variable resistor 3 to the video signal controller 2, by being superimposed on the intensity control signal, 8 is an amplifier which amplifies the contrast control signal produced by the contrast controller 7, and 9 is a capacitor for superimposing the amplified contrast control signal on the intensity control signal provided by the variable resistor 3.

The contrast controller 7 includes a white noise generator 71 which generates a white noise having a constant energy level per frequency, and a filter 72 having an attenuation characteristics of $-3$ dB per octave for making the white noise to have a frequency spectrum of 1/f.

Next, the operation will be explained. The video signal received on the input terminal 1 is sent to the video signal controller 2, by which the signal level is clamped and the amplitude is controlled in accordance with the intensity control signal in the same manner as the conventional display monitor. The video signal with a clamped signal level and controlled amplitude is sent to the amplifier 4, which amplifies the video signal in accordance with the level control signal provided by the brightness control variable resistor 5, and the amplified video signal is applied to the cathode of the CRT 6, and a picture is displayed on the CRT screen.

In the amplitude control of the video signal controller 2, the average intensity is determined by the intensity control signal which is based on the resistance of the intensity setting variable resistor 3 set by the operator. However, the intensity control signal is rendered by the superimposition of the contrast control signal supplied from the contrast controller 7 through the amplifier 8 and capacitor 9, and therefore the intensity of picture on the CRT screen varies with time in response to the contrast control signal. This intensity variation serves to reduce the screen flicker of the CRT 6 caused by the scanning operation in a constant period.

The contrast controller 7 produces the contrast control signal having a 1/f fluctuation in its frequency spectrum. The 1/f fluctuation signifies that when the power spectrum of a vibratory signal is assessed, the amplitude of each frequency component is proportional to the inverse of the frequency (frequency of vibration), i.e., 1/f, or in other words, the power spectrum plotted on a graph of logarithmic scales for both axes has a slope of $-1$ as shown in FIG. 4.

The contrast controller 7 operates on its white noise generator 71 to generate a white noise, which is fed through the filter 72 so that the white noise is attenuated at a rate of 3 dB per octave, resulting in a contrast control signal having a frequency spectrum of 1/f. The produced contrast control signal has its magnitude controlled by the amplifier 8, and it is superimposed by the capacitor 9 on the intensity control signal provided by the intensity setting variable resistor 3. The CRT 6 displays a picture by varying the intensity based on the 1/f fluctuation of the contrast control signal, and consequently the screen flicker caused by the scanning operation of a constant period is reduced.

Embodiment 2

Figure 5:
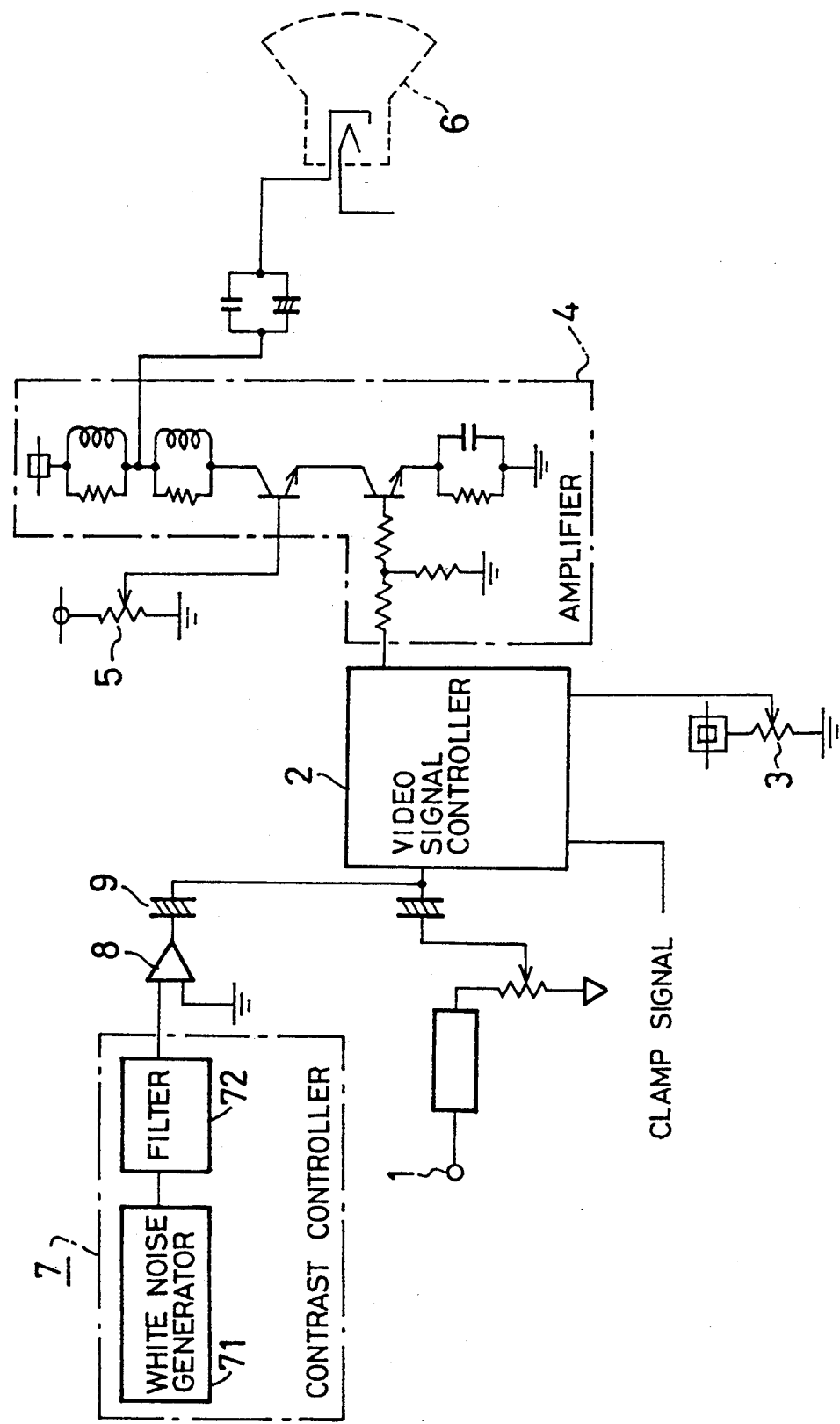
FIG. 5 is a block diagram showing the display monitor based on a second embodiment of this invention.

The contrast control signal generated by the contrast controller 7 may be directly superimposed on the video signal inputted to the video signal controller 2, instead of the contrast signal supplied from the intensity setting variable resister 3 as the intensity set portion to the video signal controller 2 that is the case of the foregoing first embodiment. FIG. 5 is a block diagram showing such embodiment. The contrast controller 7 is connected to a video signal input terminal of the video signal controller 2 through the amplifier 8 and the capacitor 9. The amplitude of the video signal inputted to the video signal controller 2 is varied with time in accordance with the contrast control signal produced by the contrast controller 7, thereby reducing the screen flicker caused by the constant period scanning operation with the contrast of the image on the CRT 6 being varied.

Embodiment 3

The contrast control signal may be varied with time in a different manner such as a periodic variation, instead of the non-periodic variation based on the 1/f fluctuation that is the case of the foregoing each embodiment.

The display monitor may be of a liquid crystal panel, instead of a CRT that is the case of the foregoing first embodiment, and the same effectiveness as of the each embodiment is attained.

As described above, the display monitor based on the first aspect of the invention includes an inexpensive addition of a contrast controller which produces a contrast control signal that varies periodically or non-periodically, and it is superimposed on the intensity control signal provided by the intensity setting device so that the intensity of display on the screen varies with time, thereby reducing the screen flicker caused by the scanning operation of a constant period, whereby the operator working at viewing the screen for longtime periods is relieved of fatigue of the eyes.

The display monitor based on the second aspect of the invention produces a contrast control signal that varies periodically or non-periodically, and it is superimposed on the video signal inputted to the video signal controller so that the intensity of display on the screen varies with time, thereby reducing the screen flicker caused by the scanning operation of a constant period. In this manner, a display monitor at which a long-term screen watching work is done with less fatigue of the eyes can be achieved is obtained by only adding a small amount of hardware with low-cost.

The display monitor based on the third aspect of the invention is designed to produce a contrast control signal with a 1/f fluctuation so as to vary the intensity control signal or the amplitude of the video signal with time, thereby blurring the flicker of picture at the vertical sync frequency. In this manner the screen flicker caused by the scanning operation of a constant period can be alleviated.

What is claimed is:

1. A display monitor comprising:
    a video signal controller which controls a display intensity supplied to a display of a video signal by controlling an amplitude of said video signal; and
    a contrast controller which produces a contrast control signal having a 1/f fluctuation that varies said intensity control signal with time by being superimposed on said intensity control signal supplied from an intensity setting device to said video signal controller to control said amplitude of said video signal.

2. A display monitor comprising:
    a video signal controller which controls a display intensity supplied to a display of a video signal by controlling an amplitude of said video signal; and
    a contrast controller which produces a contrast control signal having a 1/f fluctuation that varies said amplitude of said video signal with time by being superimposed on said video signal inputted to said video signal controller.

3. A display monitor according to claim 1, wherein said contrast control signal has a frequency spectrum with a slope of $-1$ when frequency components of said contrast control signal are plotted in terms of a power spectrum on a graph with logarithmic scales for both axes.

4. A display monitor according to claim 2, wherein said contrast control signal has frequency spectrum with a slope of $-1$ when frequency components of said contrast control signal are plotted in terms of a power spectrum on a graph with logarithmic scales for both axes.

* * * * *